US010311637B2

(12) United States Patent
Bharti et al.

(10) Patent No.: US 10,311,637 B2
(45) Date of Patent: Jun. 4, 2019

(54) COLLABORATIVE THREE-DIMENSIONAL DIGITAL MODEL CONSTRUCTION

(71) Applicant: INTERNATIONAL BUSINESS MACHINES CORPORATION, Armonk, NY (US)

(72) Inventors: Harish Bharti, Maharashtra (IN); Abhay K. Patra, Maharashtra (IN); Sarbajit K. Rakshit, Kolkata (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 22 days.

(21) Appl. No.: 15/594,783

(22) Filed: May 15, 2017

(65) Prior Publication Data
US 2018/0330542 A1 Nov. 15, 2018

(51) Int. Cl.
G06T 19/00 (2011.01)
G06F 3/01 (2006.01)
G02B 27/01 (2006.01)

(52) U.S. Cl.
CPC ........ *G06T 19/003* (2013.01); *G02B 27/0172* (2013.01); *G06F 3/011* (2013.01);
(Continued)

(58) Field of Classification Search
CPC ..... G06F 17/50; G06F 2217/04; G06T 19/00; G06T 2219/024
See application file for complete search history.

(56) References Cited

U.S. PATENT DOCUMENTS 5,357,439 A * 10/1994 Matsuzaki ....... G05B 19/41865
700/96
9,298,070 B2 3/2016 Chang
(Continued)

FOREIGN PATENT DOCUMENTS

EP 2966863 A1 1/2016

OTHER PUBLICATIONS

Nam, Tek-Jin, and David Wright. "The development and evaluation of Syco3D: a real-time collaborative 3D CAD system." Design Studies 22.6 (2001): 557-582.*
(Continued)

*Primary Examiner* — Sultana M Zalalee
(74) *Attorney, Agent, or Firm* — Michael O'Keefe; Matthew M. Hulihan; Heslin Rothenberg Farley & Mesiti PC

(57) ABSTRACT

A process identifies an anchor point of reference in a physical environment, the anchor point being a common point in each field of view of a plurality of users. The process establishes a grid structure in a field of view of a first user, the grid structure being a three-dimensional augmented reality object virtually positioned based on the anchor point at a common, static location in the environment relative to the users and for presentation to the users. The process selects a user-specific point of reference that corresponds to cell(s) of the grid structure against which the first user works in contributing to a collaborative construction of an augmented reality digital model. Based on receiving input from the first user, the process places augmented reality digital model elements into the cell(s), where contribution of the elements by the first user are reflected in the grid structure for the users.

19 Claims, 9 Drawing Sheets

(52) U.S. Cl.
CPC .... *G06T 19/006* (2013.01); *G02B 2027/0178* (2013.01); *G09G 2340/12* (2013.01)

(56) References Cited

U.S. PATENT DOCUMENTS

| | | | | |
|---|---|---|---|---|
| 2005/0215879 | A1* | 9/2005 | Chuanggui | G06T 7/001 600/407 |
| 2008/0108430 | A1* | 5/2008 | Evans | G07F 17/3258 463/27 |
| 2011/0075159 | A1* | 3/2011 | Chang | G01B 11/105 356/625 |
| 2011/0216060 | A1* | 9/2011 | Weising | G09G 5/08 345/419 |
| 2013/0239011 | A1* | 9/2013 | Red | G06T 5/00 715/743 |
| 2014/0270480 | A1* | 9/2014 | Boardman | G06T 17/00 382/154 |
| 2014/0306993 | A1* | 10/2014 | Poulos | G06T 19/006 345/633 |
| 2015/0123966 | A1* | 5/2015 | Newman | G06T 19/006 345/419 |
| 2015/0127480 | A1* | 5/2015 | Herrman | G06Q 30/0283 705/26.4 |
| 2016/0314617 | A1* | 10/2016 | Forster | G06T 17/00 |
| 2016/0381110 | A1* | 12/2016 | Barnett | H04L 65/601 709/231 |

OTHER PUBLICATIONS

Rolland, Jannick P., et al., "Development of Head-Mounted Projection Displays for Distributed, Collaborative, Augmented Reality Applications", www.creol.ucf.edu; Oct. 5, 2005; vol. 14, No. 5, 22 pgs.

Kahlesz, Ferenc, et al., "COHERENT: Collaborative Holographic Environments for Networked Tasks" [retrieved from the Internet on Jan. 20, 2017]. Retrieved from Internet URL: <http://cg.cs.uni-bonn.de/en/projects/coherent-collaborative-holographic-environments-for-networked-tasks/>, 1 pg.

"Collaborative Holographic Environments for Networked Tasks" [retrieved from the Internet on Jan. 20, 2017]. Retrieved from Internet URL: <http://cordis.europa.eu/project/rcn/71166_en.html>, 3 pgs.

"VRED—3D Visualization Software" [retrieved from the Internet on Apr. 18, 2017]. Retrieved from Internet URL: <http://capricot.com/software/vred/>, 2013-2015 by Capricot Technologies Pvt. Ltd., 1 pg.

Pan, Yi, "A peer-to-peer collaborative 3D virtual environment for visualization" [retrieved from the Internet on Apr. 18, 2017]. Retrieved from Internet URL: <http://www.academia.edu/2902142/A_peer-to-peer_collaborative_3D_virtual_environment_for_visualization>, SPIE-IS&T/vol. 5295, pp. 180-188.

Shen, Y. et al., "Collaborative design in 3D space" [retrieved from the Internet on Apr. 28, 2017]. Retrieved from Internet URL: <http://dl.acm.org/citation.cfm?id=1477900&preflayout=tabs>, VRCAI '08 Proceedings of The 7th ACM SIGGRAPH International Conference on Virtual-Reality Continuum and Its Applications in Industry, Article No. 29, Dec. 8-9, 2008, 1 pg.

Mell, Peter, et al., "The NIST Definition of Cloud Computing", NIST Special Publication 800-145, Sep. 2011, Gaithersburg, MD, 7 pgs.

* cited by examiner

COLLABORATIVE THREE-DIMENSIONAL DIGITAL MODEL CONSTRUCTION

BACKGROUND

A head-mounted wearable mobile device allows digital content to be imposed directly in the line of sight of the user on the inside of the 'lenses' of the device, which are transparent digital displays. This effect is provides an overlay in at least part of the user's view to an environment through the lenses. Example digital content includes images, videos, textual content, maps, or the like. In some examples, the digital content is augmented reality content. Head-mounted and other wearable mobile devices expand possibilities for multi-user collaboration in various realms including the sharing of content. However, facilities are needed that assist users in collaboratively constructing digital models.

SUMMARY

Shortcomings of the prior art are overcome and additional advantages are provided through the provision of a computer-implemented method. The method includes identifying an anchor point of reference in a physical environment, the anchor point of reference being a common point in each field of view of multiple users co-located in the physical environment. The method establishes a grid structure in a field of view of a first user, of the multiple users, using a mobile device of the first user, where the grid structure is a three-dimensional augmented reality object virtually positioned based on the anchor point of reference at a common, static location in the physical environment relative to the multiple users for presentation to the multiple users. The method selects a user-specific point of reference for the first user, the user-specific point of reference for the first user corresponding to one or more cells of the grid structure against which the first user is to work in contributing to a collaborative construction by the multiple users of a three-dimensional digital model in augmented reality. Based on receiving input from the first user, the method places augmented reality digital model elements of the three-dimensional digital model into the one or more cells of the grid structure, where contribution of the digital model elements by the first user to the three-dimensional digital model are reflected in the grid structure for the multiple users.

Further, a computer program product including a computer readable storage medium readable by a processor and storing instructions for execution by the processor is provided for performing a method. The method includes identifying an anchor point of reference in a physical environment, the anchor point of reference being a common point in each field of view of multiple users co-located in the physical environment. The method establishes a grid structure in a field of view of a first user, of the multiple users, using a mobile device of the first user, where the grid structure is a three-dimensional augmented reality object virtually positioned based on the anchor point of reference at a common, static location in the physical environment relative to the multiple users for presentation to the multiple users. The method selects a user-specific point of reference for the first user, the user-specific point of reference for the first user corresponding to one or more cells of the grid structure against which the first user is to work in contributing to a collaborative construction by the multiple users of a three-dimensional digital model in augmented reality. Based on receiving input from the first user, the method places augmented reality digital model elements of the three-dimensional digital model into the one or more cells of the grid structure, where contribution of the digital model elements by the first user to the three-dimensional digital model are reflected in the grid structure for the multiple users.

Yet further, a computer system is provided that includes a memory and a processor in communications with the memory, wherein the computer system is configured to perform a method. The method includes identifying an anchor point of reference in a physical environment, the anchor point of reference being a common point in each field of view of multiple users co-located in the physical environment. The method establishes a grid structure in a field of view of a first user, of the multiple users, using a mobile device of the first user, where the grid structure is a three-dimensional augmented reality object virtually positioned based on the anchor point of reference at a common, static location in the physical environment relative to the multiple users for presentation to the multiple users. The method selects a user-specific point of reference for the first user, the user-specific point of reference for the first user corresponding to one or more cells of the grid structure against which the first user is to work in contributing to a collaborative construction by the multiple users of a three-dimensional digital model in augmented reality. Based on receiving input from the first user, the method places augmented reality digital model elements of the three-dimensional digital model into the one or more cells of the grid structure, where contribution of the digital model elements by the first user to the three-dimensional digital model are reflected in the grid structure for the multiple users.

Additional features and advantages are realized through the concepts described herein.

BRIEF DESCRIPTION OF THE DRAWINGS

Aspects described herein are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

During various activities when multiple people co-located in an environment, such as a room or other interior space, want to collaborate with each other to create a three-dimensional digital model in augmented reality ("AR" herein), for example an architectural mockup of a building, bridge, or another other physical object, participants may collaboratively contribute to the model by placing various model elements to create the overall model. If no guidelines are provided to users when placing these model elements, it may be difficult for the users to construct portions of the digital model and know about what others are contributing and where those contributions are located. Described herein are facilities by which participating users can collaborate with each other using guidance of a grid structure to place model elements in an efficient manner to create the three-dimensional model. The grid structure is a three-dimensional reference presented in augmented reality for the multiple users, which helps them to build the three-dimensional model collaboratively. The grid structure can also be used to facilitate live streaming of an event by leveraging elements of reference grid.

Figure 1:
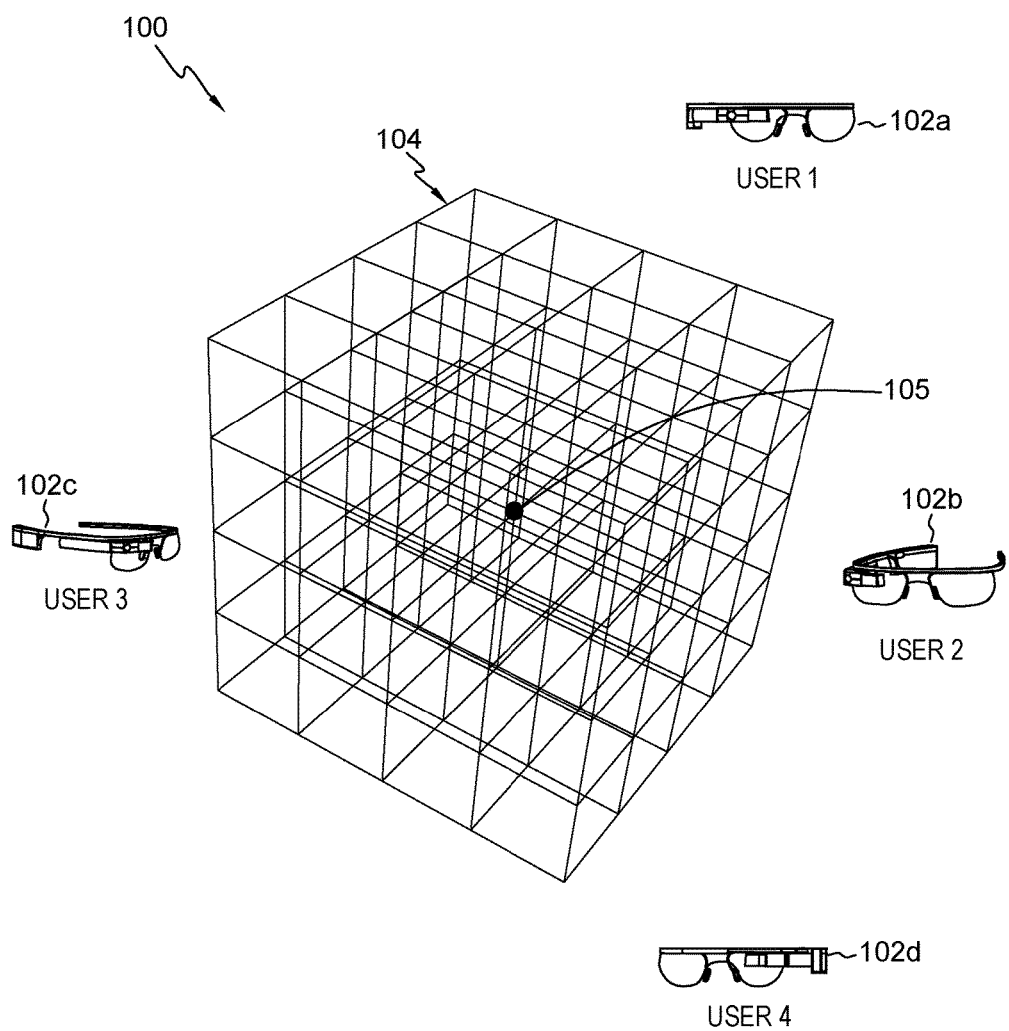
FIG. 1 depicts an example environment to incorporate and use aspects described herein, including a grid structure to facilitate user collaboration.

FIG. 1 depicts an example environment to incorporate and use aspects described herein, including a grid structure to facilitate user collaboration. Environment 100 refers to, in this example, a room with four users present and represented by head-mounted wearable mobile devices labeled 102a-102d in FIG. 1. For convenience, the head-mounted wearable devices 102a-102d may be referred to as 'users' herein.

Grid structure 104 is a static three-dimensional grid structure presented as an AR object in the respective fields of view of the participating users 102a-102d. Specifically, the grid 104 is presented as a digital element (AR content) on the inside of transparent lenses of each of the head-mounted devices 102a-102, and therefore would be unobservable to users in the environment who do not have a facility to represent augmented reality objects in the environment. FIG. 1 depicts grid structure 104 as it would appear, virtually, to users viewing that area of the environment through a head-mounted wearable device (as one example). Other example devices with augmented reality capabilities include other types of mobile devices, such as smartphones and tablets, where a user leverages a camera of the mobile device to capture/show a scene of an environment and the mobile device draws graphical AR elements on the device's display to give the impression that the AR objects actually exist in the real-world physical environment.

When users work in a collaborative manner on a three-dimensional digital model that models a physical object to be constructed or already in existence, software applications installed on the wearable devices create the grid structure as a three-dimensional augmented reality object virtually positioned in the environment. As noted, it is virtually positioned because the grid structure is a product of augmented reality construction on individual user devices; it is not a physical grid structure that exists in real space, but rather a product of digital construction on, e.g., mobile devices. The grid structure is positioned virtually in the environment so that it is visible in a common location to each of the participants. The participating users can view the static grid structure and the grid is anchored with reference to an object/point/place, referred to an anchor point of reference. A user can move around the environment and the grid structure will remain anchored with respect to the anchor point (though as described below, it may be rotated for the user). The anchor point of reference may be any reference point, one example of which is the center point of the grid structure, as in the example of FIG. 1 at point 105. Thus, the anchor point of reference is a position in the physical environment, and is common to each of the users, meaning their shared grid structure will be anchored at the same point. The anchor point may be in the field of view of the users.

The grid structure is a three-dimensional augmented reality object virtually positioned based on the anchor point of reference at a common, static location in the physical environment relative to the users for presentation to them. In some examples, the physical environment is in motion, like the case where the physical environment is a room on a moving train or a cabin of an airplane, as examples. The collaborating users in this scenario, as well as the anchor point—and by extension the position of the grid structure and any model elements constructed—will also move with the physical environment. The common, static location of the grid in the physical environment relative to the users can therefore be a changing physical geolocation that remains static relative to the physical environment (e.g. the train, plane) in motion and the users in the environment. In other words, in the scenario of a moving environment, the position of the grid in the environment is unchanging, but because the environment is itself moving in the geographic sense relative to Earth, the physical geolocations corresponding to the grid's anchor point and position in space are changing as the environment travels.

The grid structure as depicted is represented with cells, the dimensions of which may be uniform. This can help users visualize relative measurements of model objects in real space. This dimension can be selected/specified collectively by the users, e.g. as an agreed-upon or consensus dimension. It may also be changed dynamically depending on user needs. In some examples, a given user can subdivide grid cells each into multiple cells that divide evenly into their respective larger cell. Thus, a given user can change a dimension, or at least granularity of the grid cells, on as as-desired basis, which may be useful for better viewing and working precision. A larger cell granularity may be desired when viewing and working on a scale covering the entire digital model (e.g. a model of a building), whereas a smaller cell granularity may be desired when viewing and working on a scale covering just a small portion of an overall structure (e.g. a shelf on the wall of a room of the building). This allows a user to further divide cells to appropriate sized sub-cells so that model element curvature and shape can be easily contracted with the sub-cells, sub-cells of those sub-cells, etc. In this manner, the grid structure includes cells of a selected dimension for all of the users, and a user can individually divide one or more cells (for instance cell(s) into which the user is assigned to place digital model elements) into sub-cells for the user. Those divisions may be viewable to that user (and optionally other user(s)) but also may not appear as part of the grid structure for other users(s).

Participating users can fill (partially or fully) cell(s) in the grid with digital model elements that are represented as AR elements for the user and also the other users, in order to build the virtual three-dimensional digital model. The model is shown through the wearable devices as being present in the real world environment in which the users work as the users construct the digital model. In some examples, the users gather around a workbench, table, or other work space, look generally in a common direction down at the work-space, and see the grid structure and model elements that have been placed 'in' the grid to construct the digital model. The AR digital model elements of the three-dimensional digital model are placed (programmatically by software based on user placement/input from the users) into the cells of the grid structure. The contributions of the digital model elements by the users are reflected in the grid structure that is presented to all users. As described above, the grid structure and model elements placed into the cells are synchronized with respect to all users, so each of the grid features and placed model elements may be located (virtually) in the environment at the same locations across all users. Thus, software installed on the user devices, remote computer systems, or a combination of the foregoing offer coordination in terms of the presentation of the AR content on the devices of the users. Software installed on the individual devices may communicate with each other over wired or wireless communications links, for instance over Wi-Fi, cellular, or other network connections, or NFC connections such as Bluetooth. Additionally or alternatively, the devices may communicate with one or more remote computer systems, such as cloud or other remote servers, offering coordination and/or processing to support the collaborative and synchronized nature of the digital model construction and presentation. Any of various three-dimensional modeling software products may be utilized to handle the digital construction of the model.

User input to their respective wearable devices can include finger movements, position movement, or any other input to select, define, create, etc. digital model elements to fill cell(s) of the grid. Eventually the contributions of the users form a final three-dimensional model/shape. The grid structure helps the participating users place elements and populate the appropriate cells very precisely with correct and common measurements and positions across all users. Each user can individually fill cells of the grid structure, the common dimension of cells helping the users understand the distance and alignment of the model's features.

Figure 2:
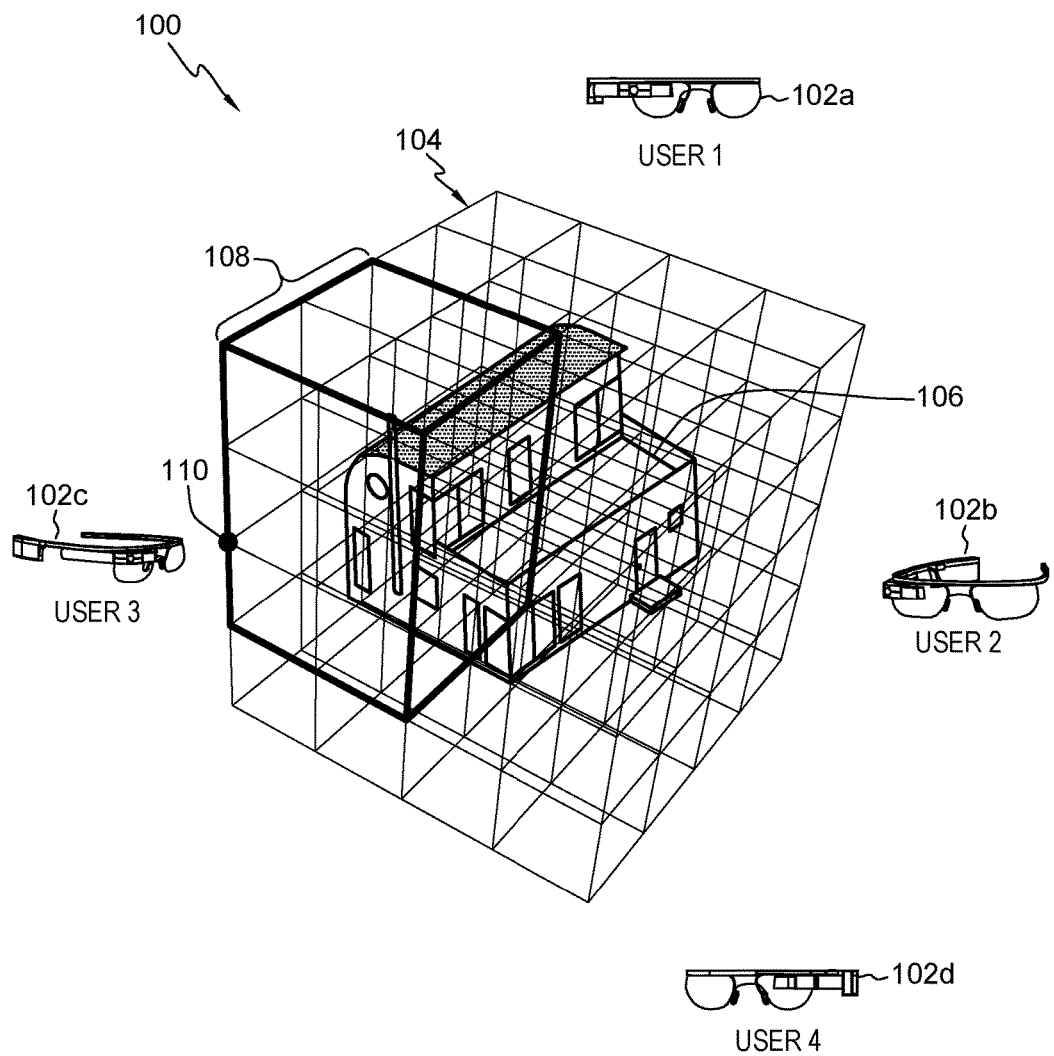
FIG. 2 depicts the environment of FIG. 1 with a partial three-dimensional digital model shown in a grid structure, in accordance with aspects described herein.

FIG. 2 depicts the environment of FIG. 1 with a partial three-dimensional digital model shown in a grid structure, in accordance with aspects described herein. Each user may be assigned or select a user point of reference, which corresponds to one or more cells of the grid structure, the one or more cells being those against which the first user is to work in contributing model elements to the collaborative construction of the digital model. An individual user's point of reference informs a vantage point from where that user views the model and performs work. When constructing the model, each user can take a section/object, point, etc. corresponding to the model. A user's user-specific reference point allows the user to have the user's own temporary reference point from which the user can work for a given section of the model and build the user's part, based on that portion of the grid model. Referring to FIG. 2, 110 indicates an example user-specific reference point for user 3 (102*c*). The cells corresponding to the user's reference point are indicated by 108 (bounded by bold lines), and represent 12 cells of the grid in the corner nearest user 3. Thus, user 3 102*c* may have constructed the portions of the digital model 106 (a house) that extend into those cells, including the chimney and various windows on the side of the house.

Based on the user activities, multiple different users may work from a same point of reference if they desire to view the grid structure and model, and act (contribute), from a common perspective. Conversely, users can use different points of reference if they desire to work on different parts of the model. When users desire to work from a common angle and/or using the same user reference point, then in some embodiments software installed on the mobile device a first user can rotate the grid structure and the model elements contributed thereto to match the angle of the other user so both view the user specific reference point and corresponding cells from a same angle, even though the users may not be physically positioned in the exact same location in the environment. In other words, the grid structure and model elements, which are AR constructs presented to each of the collaborating users, can be oriented for a given user in any of various rotations, while maintaining the relative positioning and dimensioning of the model elements and grid structure elements. Consequently, one orientation of the grid structure in the field of view of the first user can initially position some cells (e.g. that user's cells) to face the first user, and then at some point re-orient the grid structure in the field of view of the first user so that other cells of the grid structure (corresponding to another user-specific point of reference for a second user) face the first user, to thereby replicate for the first user the second user's view to the grid structure.

Additional temporary points of reference can also be established. These may be any arbitrary points of reference from which a perspective to the grid structure and digital model is desired—they need not necessarily be user-specific points of reference that correspond to cell(s) that a specific user works on. A temporary point of reference can be used for a focus/vantage point for user(s), which may be useful when several users want to jointly collaborate on specific portion of the model, where no single user is responsible for that portion.

Also provided is the ability to zoom in and zoom out with respect to the grid structure, for instance based on a desire to view/act on a specific and detailed position. In some aspects, the zoom scale is synchronized across the users, so that a user zooming (in or out) relative to the grid structure to increase/decrease scale of the grid structure in the field of view of the first user will cause that zoom level to be applied in the presentation of the grid structure to the other users. This may be the case regardless of whether the users are viewing a different portion of the grid structure. Sometimes the zoom feature may be useful when the user works with curved or other shaped surface/features of the digital model (corresponding to curved/shaped features of the physical object being modeled). Additionally, zoom level together with scale factors and cell dimensions can be used to mathematically determine related variables like radii of curvature of curves.

Figure 3:
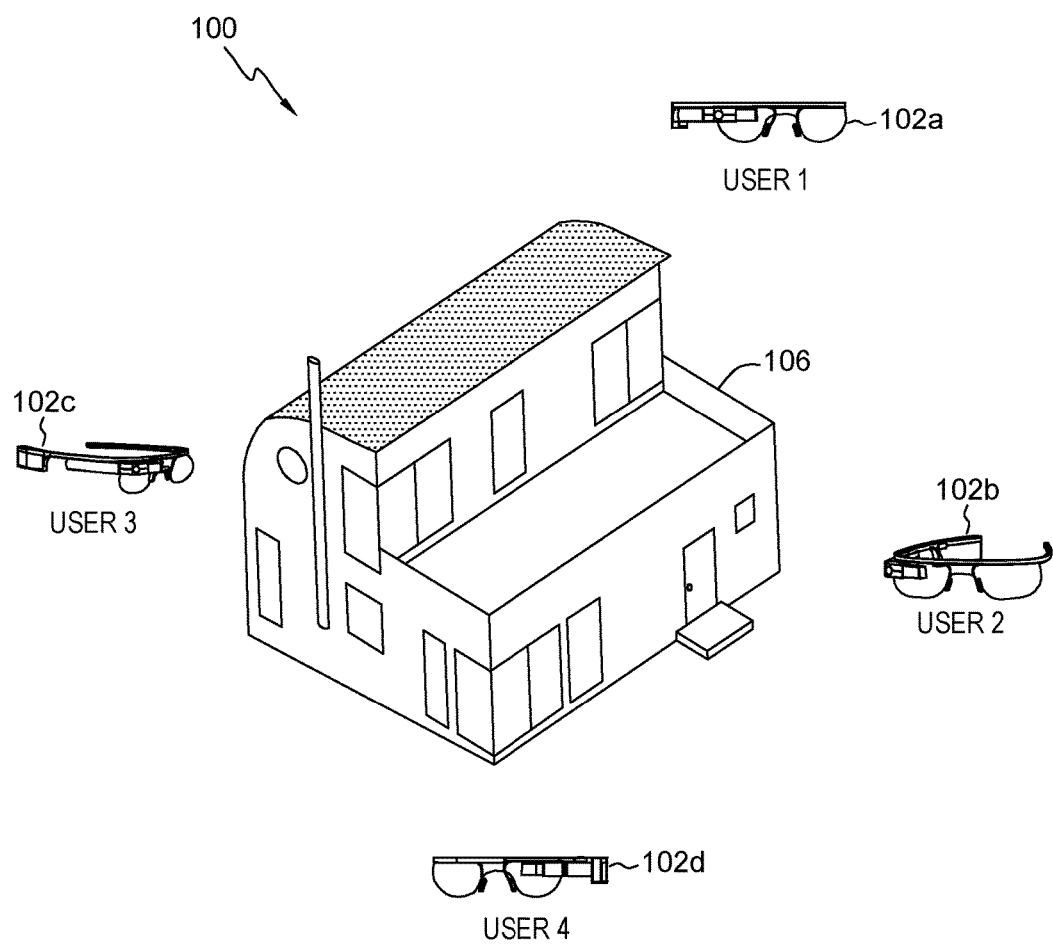
FIG. 3 depicts the example of FIG. 2 with the grid structure removed.

FIG. 3 depicts the example of FIG. 2 with the grid structure removed. When the construction of the digital model is complete or at any other desired time, user(s) can provide input to remove (either on their own wearable device or across everyone's) the grid structure in order to view the three-dimensional digital model without the grid structure being displayed. In this regard, the digital AR elements forming the grid structure may be removed from the displays of the participating users, while maintaining the display of the model elements making up the three-dimensional model, as shown by model 106 in FIG. 3. The grid structure removal may be on a user-by-user basis because one user may wish to visualize the model (or portions thereof) without the grid structure present, while another user who is actively working on the model may desire that the grid structure remain present in that user's line of sight.

Participating user(s) restore the grid in their line(s) of sight whenever desired, for instance when making modifications to the model.

As an enhancement, the volume of the grid cells can be used to provide an indication (e.g. exact or rough measure) of the volume occupied by portions of the digital model, and therefore indicate (exactly or roughly) the volume that is to be occupied by portions of the physical object that are modeled by those portions of the digital model. If the volume of a cell of the grid structure correlates to 2 cubic inches (real world) in the digital model, and the model is a scaled-down version of the physical object to be constructed, then the percentage of a cell that is filled by a model element can be translated into a real-world volume occupied by that portion of the digital model, which can in turn be translated into a real-world volume of the physical object portion(s) being modeled by that portion of the digital model. Extending this further, the materials cost to construct the physical object portion(s) can be determined if the materials cost per unit volume of material is known. This can be used to figure out not only approximately how much material will be needed, but the cost of such material. A construction engineer, for instance, could calculate, from an ascertained volume of cells of the grid structure occupied by digital model elements of the three-dimensional digital model (as determined by software, for instance) and applying a scaling factor to the ascertained volume an indication of a volume to be occupied by the physical object, and determine from this an anticipated material cost to build the physical object.

Additionally or alternatively, cell(s) worked on by a user and/or model elements contributed by the user can be tagged with the user's name or other identification to identify which users contributed which portions of the digital mode. This can be used to incentivize contribution. For instance, users may be compensated or otherwise awarded based on their contribution to the model, as indicated by tagging of the elements or cells.

Figure 4:
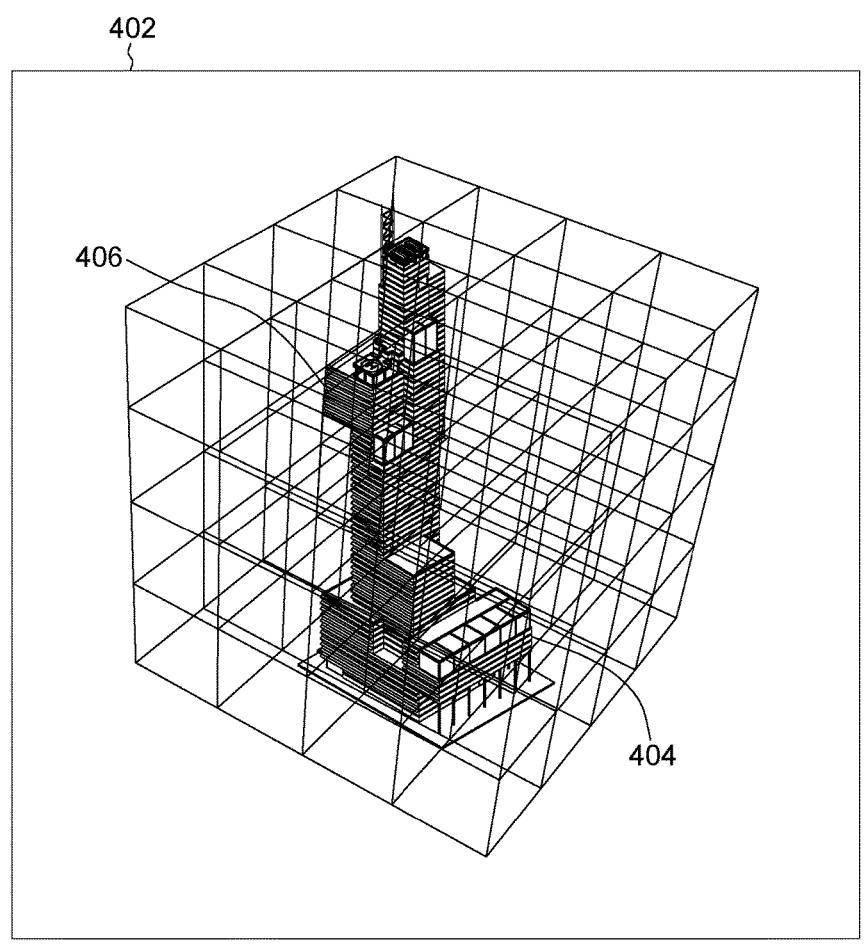
FIG. 4 depicts one example of overlaying a grid structure over a physical object to highlight features of the physical structure, in accordance with aspects described herein.

FIG. 4 depicts one example of overlaying a grid structure over a physical object to highlight features of the physical structure, in accordance with aspects described herein. In FIG. 4, frame 402 represents an image frame of image(s) captured by a head-mounted wearable mobile device. Here, a user is viewing a physical environment with an object 404 depicted in the user's line of sight. In some examples, the object is the digital model constructed by users and presented as an AR object in the user's line of sight. In other examples, the object 404 is a real world physical object, for instance one constructed based on the digital model. It is seen that the grid structure is overlaid over the object in the environment. The overlaying highlights for the user a degree of alignment/misalignment between the grid structure and portion(s) of the physical object. For instance, the grid structure can be aligned to a portion 406 of the object to highlight that this is a protrusion in object 404. The grid overlay can also be used for estimating/calculating a volume of the physical structure, for instance by visually or computationally aggregating a unit volume of grid cells occupied by the object.

Thus, users can visualize and validate the alignment of physical objects by overlaying a three-dimensional grid over the physical object. Inclination of a road, surface features of a building, and other physical features of a physical object can be highlighted because of the common dimensions and volume of the cells of the grid. If there is a misalignment between physical object and the grid structure, then software can optionally highlight the area(s) of misalignment. Construction engineers can visualize the difference in levels and take corrective action accordingly. By changing the dimensions of the grid cells, surface roughness can also be measured. In this regard, if cell size is large enough (larger grid cell dimension), this can highlight the contours of a surface.

The grid structure can also provide a three-dimensional reference model to facilitate collaborative live streaming of an event, where users are seated at different viewing positions to a live scene in an environment. Based on a desired vantage point/focus to the event, specifically a point of reference, the stream from the user located in the grid cell (or closest to the grid cell) offering the best vantage point/focus to the point of reference is activated for display at the live stream. As an example, a grid could be used to fill a stadium in which a sporting event takes place. Users can focus on different people or happenings in the scene (the sporting event). The cell to best view a desired focus or reference in the scene is identified and a user in or closest to that cell is selected, and the video stream provided from that user's device and vantage point.

Accordingly, described herein are facilities by which participating users can collaborate with each other with guidance of a grid structure to place model elements in an efficient manner to create the three-dimensional model. When a digital model is to be collaboratively created, participating users' head mounted devices can communicate with each other and identify a common anchor reference point within a common field of view of the users. The anchor reference point can be a specific geo-coordinate, a static object, or the like, which is statically located relative to the uses (i.e. their movement does not affect position of the anchor).

The head mounted devices and software installed thereon can identify the anchor reference point, for instance a center point of a digital model to be created. Additional temporary points of reference can also be established to serve as focus for the users based on their requirements at any given point of time. Users can select or be assigned user points of reference from which they would view the gird structure and perform work to construct the digital model. Based on desired activities, a user can switch to a same point of reference as another user if the user desired to view and act from a same angle as the other user. Alternatively, the users can work from different points of reference, for instance when they are working on different parts of the model.

Based on a user's configuration (section of the grid, zoom level, etc.), the grid structure is created on the user's device and is visible in the user's line or sight, e.g. imposed on a display of the device as an AR object.

The virtual positioning of the grid structure relative to real-world space may change, while remaining static relative to the participating users who are also moving. For instance, the participating users may be travelling in a moving environment such as a train. Since the users are moving, the anchor point may be moving, and therefore the grid and model elements as well. It is traveling in the real world with the users, but with respect to the user positioning, the position of the grid may remain fixed.

A user can approach cell(s) and, with a finger gesture or other input, can select a cell or cell portion and mark the cell as filled with one or more model elements. The user may select from a library of model elements, or define the user's own, which can be placed in the grid structure ad AR elements and communicated from the user's device to the devices of the other users, which each other user's respective device will populate the appropriate cell(s) in that user's grid structure with the added model elements. Participating users collaborate to fill cells of the grid, eventually creating a final three-dimensional digital model. The grid structure helps the participating users to accurately place elements and fill the appropriate cells precisely, with correct measurement and position.

A user can select one or more cells and create sub-cells within those cell(s) per the user's particular requirement. The user's work can be against those sub-cells individually or against groups of sub-cells.

Dimension of the cells in the grid can be changed at any point, if desired. The changes may be effected to assist with the assembly or addition of small objects of the overall digital model, and better precision in viewing the model is achieved. By changing the dimension of the grid, surface roughness can also be measured.

A user can zoom in/out on the grid dynamically, and may base the zoom on curvature or other features of the physical object being modeled. Additionally or alternatively, the user can further divide cells to appropriate sized sub-cell so that the curvature or other features can be easily built using sub-cells and sub-cells of those sub-cells.

Users can also visualize and validate the alignment of a physical/model object by overlaying the grid structure over the object. Software can identify and highlight areas of misalignment of the object with the grid. When the object is a physical object, engineers can visualize the differences in alignment and take corrective action accordingly.

Cells or model elements created by users can be tagged with those user's identifiers, and this can be used in an incentive program to incentivize contribution by tracking and awarding contribution.

At any point in time, the grid can be removed, partially removed or modified (for instance cell dimension). In some embodiments this change is reflected to the grid structure as it is presented to all users.

Further, using the known volume of each unit cell, software can roughly measure the volume of the physical object, to inform of aggregated volume of the object and its components.

A proposed grid structure reference model also provides the ability for collaborative live streaming of an event where users are seated at different viewing positions in the event location, and based on the focus of the event, a user located in a grid cell of (or closest to) a focus point that is best suited to cover live streaming of a focus area (point of reference) is activated for live streaming.

Figure 5:
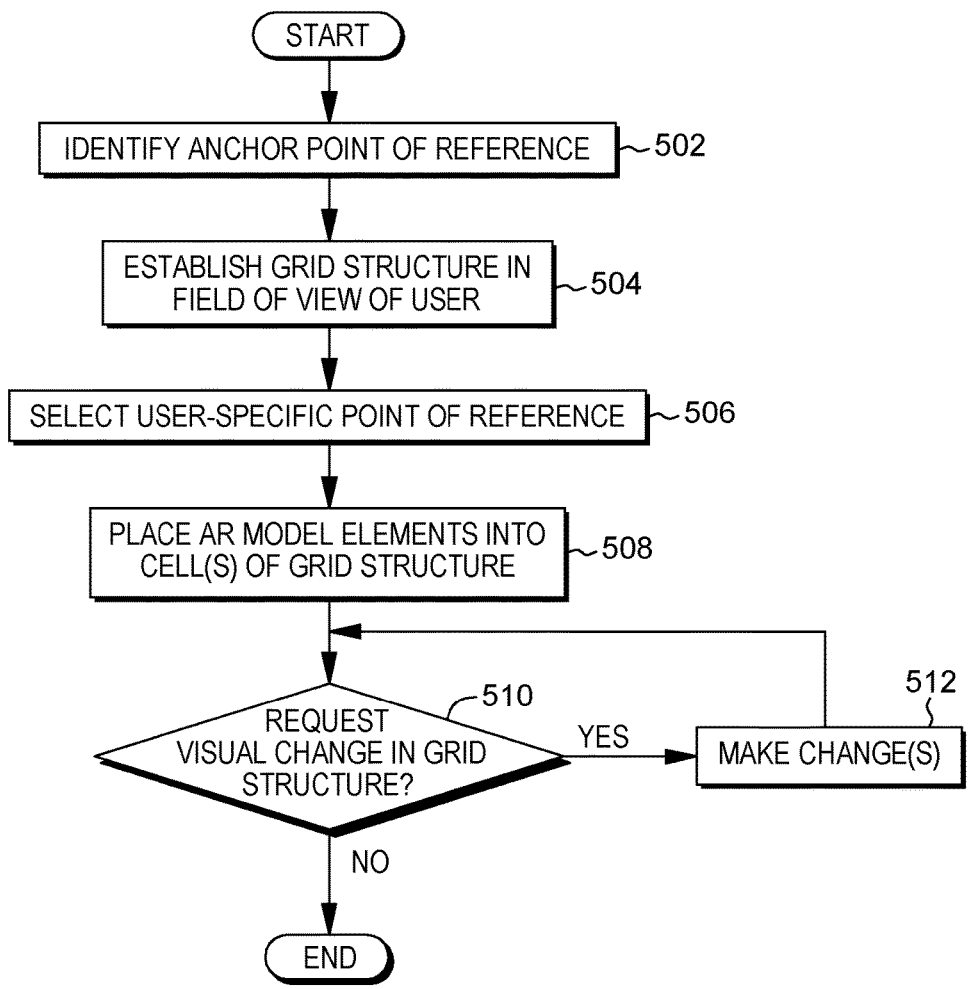
FIG. 5 depicts an example process for collaborative three-dimensional digital model construction, in accordance with aspects described herein.

FIG. 5 depicts an example process for collaborative three-dimensional digital model construction, in accordance with aspects described herein. In some examples, the process is performed by one or more computer systems, such as those described herein, which may include one or more mobile device, such as one or more head-mounted wearable devices, one or more cloud-based or other remote computer systems, and/or one of more other computer systems. In some embodiments, the process of FIG. 5 is performed by each of one or more mobile devices, each associated with a different user of the multiple users who collaborate to construct the digital model.

The process begins by identifying an anchor point of reference in a physical environment (502). The anchor point of reference may be a common point in each field of view of a plurality of users co-located in the physical environment. The anchor serves as a baseline or common point, for instance a point that is the center of the grid, as one example.

In some examples, the anchor point of reference is a static geolocation, i.e. a static, non-changing point on earth (for instance a point of a stationary object, or a fixed point in space). In other examples, the physical environment is a physical environment in motion, where the plurality of users and the grid structure are moving with the physical environment, where the anchor point of reference moves with the physical environment in motion, and where the common, static location in the physical environment relative to the plurality of users is a changing geolocation that remains static relative to the physical environment in motion and the plurality of users in the environment but is changing relative to Earth.

The process of FIG. 5 then establishes a grid structure in a field of view of a first user, of the plurality of users, using a mobile device of the first user (504). The grid structure is a three-dimensional augmented reality object virtually positioned based on the anchor point of reference at a common, static location in the physical environment relative to the plurality of users for presentation to the plurality of users. The positioning of the grid is based on the anchor in that the anchor may be a particular point of the grid, for instance a center point or a corner point, or the grid may be specified as a fixed vector in space from the anchor point.

The process selects a user-specific point of reference for the first user (506), the user-specific point of reference for the first user corresponding to one or more cells of the grid structure against which the first user is to work in contributing to a collaborative construction by the plurality of users of a three-dimensional digital model in augmented reality. Based on receiving input from the first user, for instance gesture input, voice input or the like, the process places augmented reality digital model elements of the three-dimensional digital model into the one or more cells of the grid structure (508). Contribution of the digital model elements by the first user to the three-dimensional digital model are reflected in the grid structure for the plurality of users, meaning that the contributed elements are shown in the grid presented to each of the collaborating users. Additionally, in some embodiments, the placed model elements and/or the cells that the user as contributed to are tagged with an indication of the first user to identify the first user as having contributed to the cell(s) or contributed the digital model elements.

The process determines whether a request is received for a visual change in the grid structure (510). If not (510, N), the process ends (or optionally loops back to another aspect of FIG. 5, for instance to just before 506, 508, or 510). If instead a request was received (510, Y), the process makes the requested change(s) 512 and returns to, e.g., just prior to 510.

Such visual changes can include one or more of the following, as examples:

The grid structure can include cells of a selected dimension for each of the users, and the request can be a request to change cell dimension. In this situation, the process divides the one or more cells (corresponding to the first user, i.e. the one making the request) into sub-cells for the first user, where the sub-cells are viewable to the first user as part of the grid structure. In some embodiments, the sub-cells are not viewable in the grid structure for any, or some, of the other users. Thus, when a user sub-divides the cells, that division may be unique to that user, meaning other users working on other portions of the grid may not see those subdivisions because they might not apply to the other users' work.

Additionally or alternatively, an orientation of the grid structure in the field of view of the first user initially positions the one or more cells (corresponding to the user's point of reference) facing the first user and the change request is a change to view/work from another point of reference, such as one of another user. The process can therefore include re-orienting the grid structure in the field of view of the first user so that one or more other cells, of the grid structure, corresponding to another user-specific point of reference for a second user of the plurality of users faces the first user, to thereby replicate for the first user the second user's view to the grid structure.

Additionally or alternatively, the requested change may be to zoom in or out on the grid structure. The process can therefore zoom in (or out) on the grid structure to enlarge the grid structure in the field of view of the requesting user. In some embodiments, the zoom level applied in the zooming is also applied to enlarge (or shrink) the grid structure in the presentation of the grid structure to other users of the plurality of users. In this manner, the zoom can be applied for everyone.

As an additional aspect, the process can include overlaying the grid structure over a physical object in the physical environment, the overlaying highlighting for the first user a degree of misalignment between the grid structure and a portion of the physical object.

Additionally or alternatively, a process can ascertain a volume of cells of the grid structure occupied by digital model elements of the three-dimensional digital model, apply a scaling factor to the ascertained volume, the scaling factor being based on a scale at which the three-dimensional model is being constructed relative to a physical object to be constructed that is being modeled by the three-dimensional digital model, the applying providing an indication of a volume to be occupied by the physical object, and determine an anticipated material cost to build the physical object based on the indicated volume to be occupied by the physical object. For example, the model may be built at 1:128 scale of real object to be built. The volume occupied by a model element could then be scaled-up based on that 1:128 factor, in order to calculate an actual volume occupied (or that will be occupied) by the physical object.

If cells or elements are tagged to identify the contributing user, a process can determine an award for the user based on the tagging.

As yet an additional aspect, in some examples a process provides a live video stream that includes video of a view of the first user to the physical environment, the video of the view of the first user captured by a camera of the user's mobile device and the video of the view of the first user being selected based on a desired focus to the physical environment and based further on the view of the first user to the physical environment being superior to views of other users of the plurality of users to the physical environment.

Although various examples are provided, variations are possible without departing from a spirit of the claimed aspects.

Figure 6A:
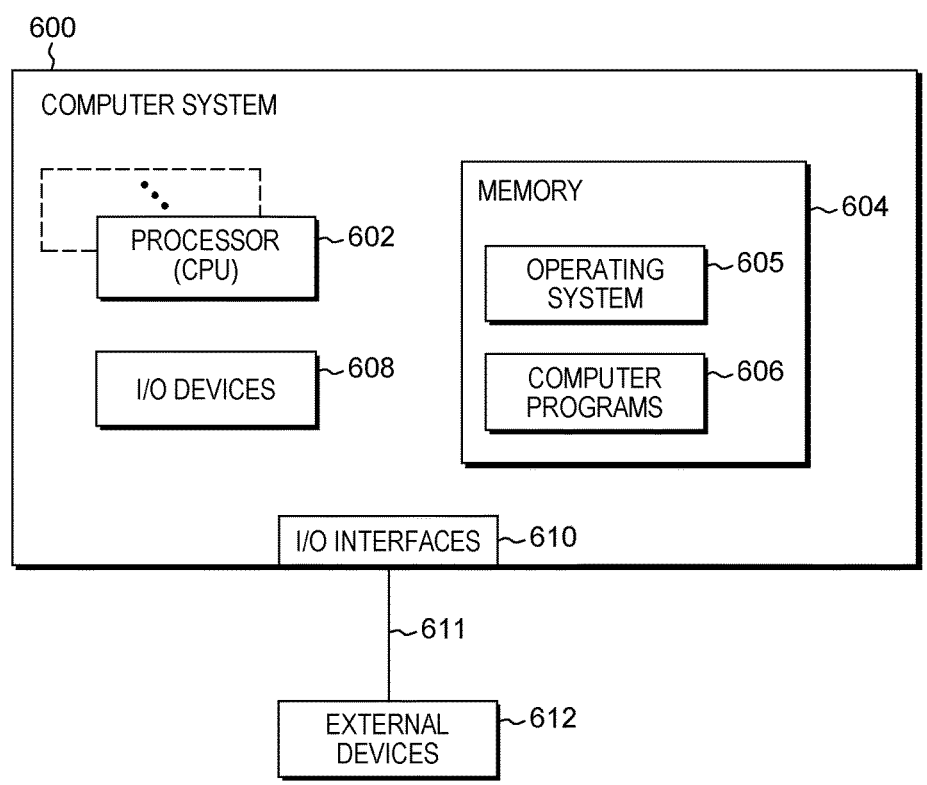
FIG. 6A depicts one example of a computer system and associated devices to incorporate and/or use aspects described herein.

Processes described herein may be performed singly or collectively by one or more computer systems, such as one or more wearable devices, as examples. FIG. 6 depicts one example of such a computer system and associated devices to incorporate and/or use aspects described herein. A computer system may also be referred to herein as a data processing device/system, computing device/system/node, or simply a computer. The computer system may be based on one or more of various system architectures and/or instruction set architectures, such as those offered by International Business Machines Corporation (Armonk, N.Y., USA), Intel Corporation (Santa Clara, Calif., USA) or ARM Holdings plc (Cambridge, England, United Kingdom), as examples.

FIG. 6 shows a computer system 600 in communication with external device(s) 612. Computer system 600 includes one or more processor(s) 602, for instance central processing unit(s) (CPUs). A processor can include functional components used in the execution of instructions, such as functional components to fetch program instructions from locations such as cache or main memory, decode program instructions, and execute program instructions, access memory for instruction execution, and write results of the executed instructions. A processor 602 can also include register(s) to be used by one or more of the functional components. Computer system 600 also includes memory 604, input/output (I/O) devices 608, and I/O interfaces 610, which may be coupled to processor(s) 602 and each other via one or more buses and/or other connections. Bus connections represent one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

Memory 604 can be or include main or system memory (e.g. Random Access Memory) used in the execution of program instructions, storage device(s) such as hard drive(s), flash media, or optical media as examples, and/or cache memory, as examples. Memory 604 can include, for instance, a cache, such as a shared cache, which may be coupled to local caches (examples include L1 cache, L2 cache, etc.) of processor(s) 602. Additionally, memory 604 may be or include at least one computer program product having a set (e.g., at least one) of program modules, instructions, code or the like that is/are configured to carry out functions of embodiments described herein when executed by one or more processors.

Memory 604 can store an operating system 605 and other computer programs 606, such as one or more computer programs/applications that execute to perform aspects described herein. Specifically, programs/applications can include computer readable program instructions that may be configured to carry out functions of embodiments of aspects described herein.

Examples of I/O devices 608 include but are not limited to microphones, speakers, Global Positioning System (GPS) devices, cameras, lights, accelerometers, gyroscopes, magnetometers, sensor devices configured to sense light, proximity, heart rate, body and/or ambient temperature, blood pressure, and/or skin resistance, and activity monitors. An I/O device may be incorporated into the computer system as shown, though in some embodiments an I/O device may be regarded as an external device (612) coupled to the computer system through one or more I/O interfaces 610.

Computer system 600 may communicate with one or more external devices 612 via one or more I/O interfaces 610. Example external devices include a keyboard, a pointing device, a display, and/or any other devices that enable a user to interact with computer system 600. Other example external devices include any device that enables computer system 600 to communicate with one or more other computing systems or peripheral devices such as a printer. A network interface/adapter is an example I/O interface that enables computer system 600 to communicate with one or more networks, such as a local area network (LAN), a general wide area network (WAN), and/or a public network (e.g., the Internet), providing communication with other computing devices or systems, storage devices, or the like. Ethernet-based (such as Wi-Fi) interfaces and Bluetooth® adapters are just examples of the currently available types of network adapters used in computer systems (BLUETOOTH is a registered trademark of Bluetooth SIG, Inc., Kirkland, Wash., U.S.A.).

The communication between I/O interfaces 610 and external devices 612 can occur across wired and/or wireless communications link(s) 611, such as Ethernet-based wired or wireless connections. Example wireless connections include cellular, Wi-Fi, Bluetooth®, proximity-based, near-field, or other types of wireless connections. More generally, communications link(s) 611 may be any appropriate wireless and/or wired communication link(s) for communicating data.

Particular external device(s) 612 may include one or more data storage devices, which may store one or more programs, one or more computer readable program instructions, and/or data, etc. Computer system 600 may include and/or be coupled to and in communication with (e.g. as an external device of the computer system) removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media.

Computer system 600 may be operational with numerous other general purpose or special purpose computing system environments or configurations. Computer system 600 may take any of various forms, well-known examples of which include, but are not limited to, personal computer (PC) system(s), server computer system(s), such as messaging server(s), thin client(s), thick client(s), workstation(s), laptop(s), handheld device(s), mobile device(s)/computer(s) such as smartphone(s), tablet(s), and wearable device(s), multiprocessor system(s), microprocessor-based system(s), telephony device(s), network appliance(s) (such as edge appliance(s)), virtualization device(s), storage controller(s), set top box(es), programmable consumer electronic(s), network PC(s), minicomputer system(s), mainframe computer system(s), and distributed cloud computing environment(s) that include any of the above systems or devices, and the like.

Figure 6B:
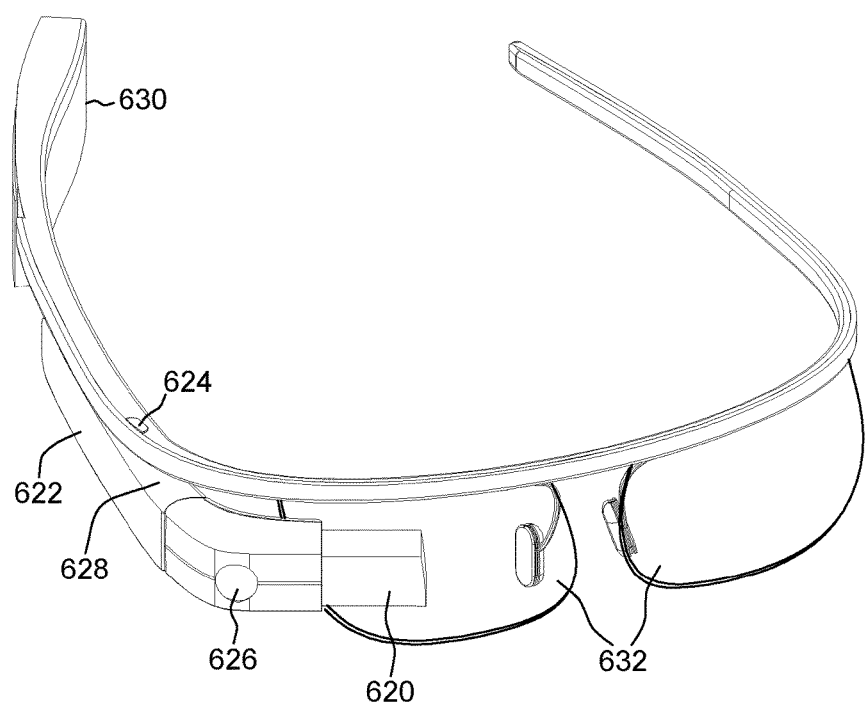
FIG. 6B. depicts one example of a head-mounted wearable mobile device in accordance with aspects described herein.

FIG. 6B depicts another example of a computer system to incorporate and use aspects described herein. FIG. 6B depicts an example head-mounted eyewear based wearable device, which may include many of the same types of components included in computer system 600 described above. In the example of FIG. 6B, the device is configured to be wearable on the head of the device user. The device includes a display 620 that is positioned in a vision line of sight of the user when the device is in operative position on the user's head. Suitable displays can utilize LCD, CRT, or OLED display technologies, as examples. Lenses 632 may optionally include active translucent displays, in which an inner and/or outer surface of the lenses are capable of displaying images and other content, for instance augmented reality content. This provides the ability to impose this content directly into the line of sight of the user, overlaying at least part of the user's view to the environment through the lenses. In particular embodiments described herein, content presented on the lens displays include AR models.

The device of FIG. 6B also includes touch input portion 622 that enable users to input touch-gestures in order to control functions of the device. Such gestures can be interpreted as commands, for instance a command to take a picture, a command to launch a particular service or application, or a command to build/place AR objects. The device also includes button 624 in order to control function(s) of the device. Example functions include locking, shutting down, or placing the device into a standby or sleep mode.

Various other input devices are provided, such as camera 626, which can be used to capture images and/or video. The camera can also be used by the device to obtain an image of the user's view of his or her environment to use in, for instance, capturing images/videos of a scene. One or more microphones, proximity sensors, light sensors, accelerometers, speakers, GPS devices, and/or other input devices (not labeled) may be additionally provided, for instance within housing 628. Housing 628 can also include other electronic components, such as electronic circuitry, including processor(s), memory, and/or communications devices, such as cellular, short-range wireless (e.g. Bluetooth), or WiFi circuitry for connection to remote devices. Housing 628 can further include a power source, such as a battery to power components of the device. Additionally or alternatively, any such circuitry or battery can be included in enlarged end 630, which may be enlarged to accommodate such components. Enlarged end 630, or any other portion of the device, can also include physical port(s) (not pictured) used to connect the device to a power source to recharge a battery and/or any other external device, such as a computer. Such physical ports can be of any standardized or proprietary type, such as Universal Serial Bus (USB).

Aspects described herein may be incorporated into and/or use a cloud computing environment. It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes. One such node is node 10 depicted in FIG. 7.

Computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

Figure 7:
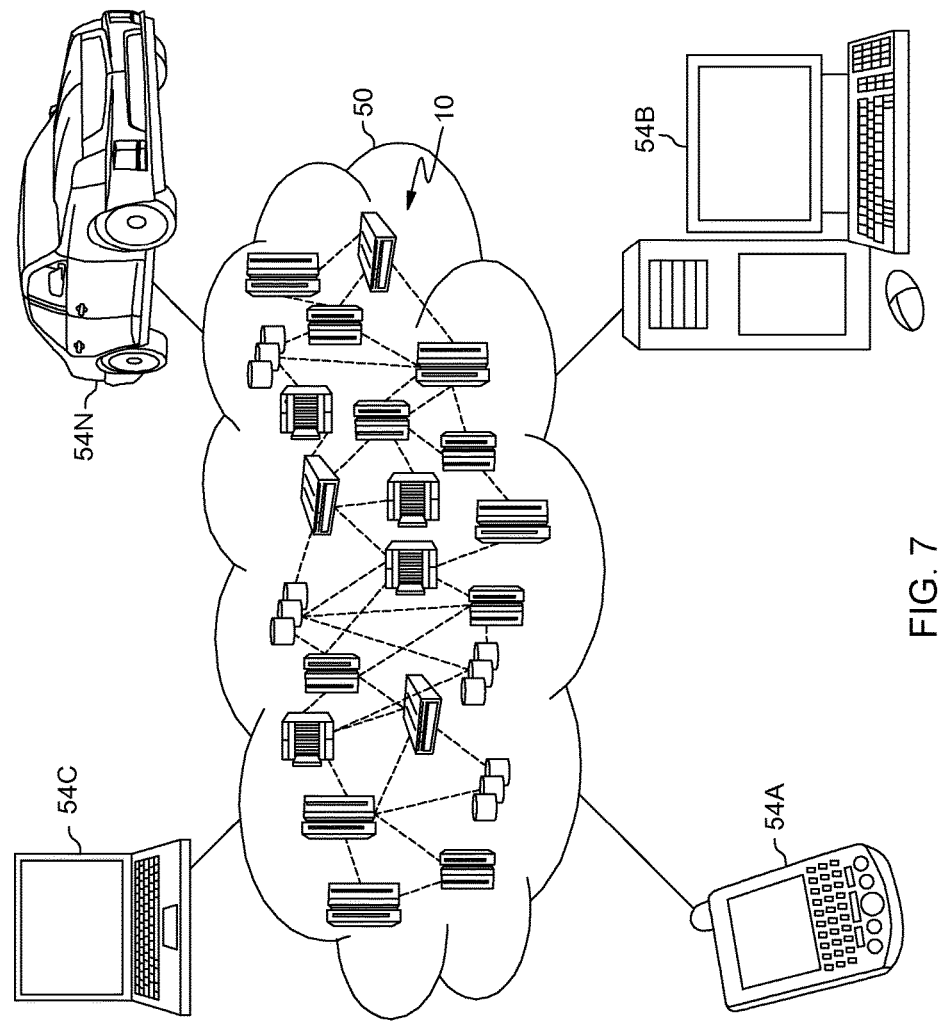
FIG. 7 depicts a cloud computing environment according to an embodiment of the present invention.

Referring now to FIG. 7, illustrative cloud computing environment 50 is depicted. As shown, cloud computing environment 50 comprises one or more computing nodes 10 with which local computing devices used by cloud consumers, such as, for example, smartphone or other mobile device 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
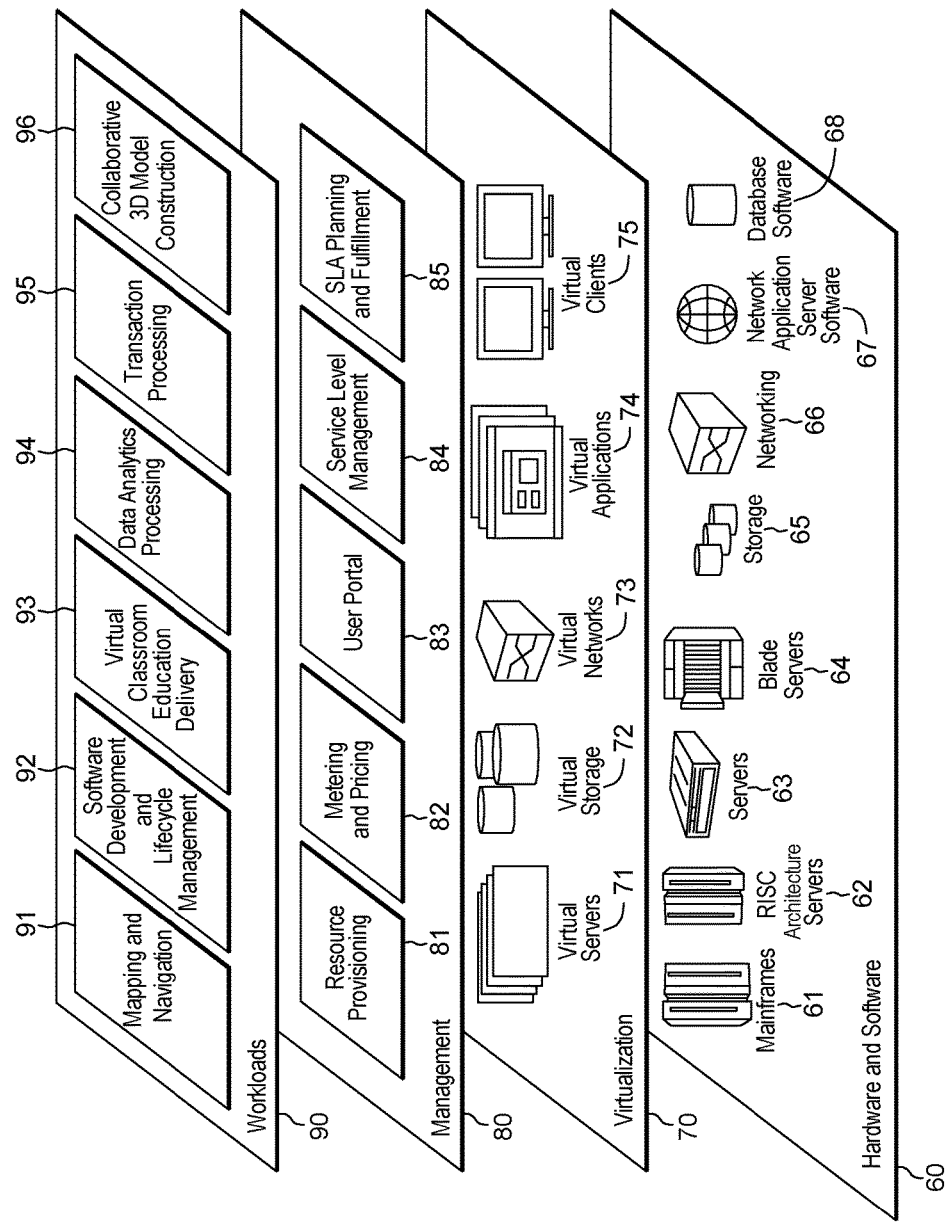
FIG. 8 depicts abstraction model layers according to an embodiment of the present invention.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and collaborative three-dimensional digital model construction 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method comprising:
identifying an anchor point of reference in a physical environment, the anchor point of reference being a common point in each field of view of a plurality of users co-located in the physical environment;
establishing a grid structure in a field of view of a first user, of the plurality of users, using a mobile device of the first user, wherein the grid structure is a three-dimensional augmented reality object virtually positioned based on the anchor point of reference at a common, static location in the physical environment relative to the plurality of users for presentation to the plurality of users;
selecting a user-specific point of reference for the first user, the user-specific point of reference for the first user corresponding to one or more cells of the grid structure against which the first user is to work in contributing to a collaborative construction by the plurality of users of a three-dimensional digital model in augmented reality;
based on receiving input from the first user, placing augmented reality digital model elements of the three-dimensional digital model into the one or more cells of the grid structure, wherein contribution of the digital model elements by the first user to the three-dimensional digital model are reflected in the grid structure for the plurality of users;
ascertaining a volume of cells of the grid structure occupied by digital model elements of the three-dimensional digital model;
applying a scaling factor to the ascertained volume, the scaling factor being based on a scale at which the three-dimensional model is being constructed relative to a physical object to be constructed that is being modeled by the three-dimensional digital model, the applying providing an indication of a volume to be occupied by the physical object; and
determining an anticipated material cost to build the physical object based on the indicated volume to be occupied by the physical object.

2. The method of claim 1, wherein the grid structure comprises cells of a selected dimension for the plurality of users, and wherein the method further comprises dividing the one or more cells into sub-cells for the first user, wherein the sub-cells are viewable to the first user as part of the grid structure and do not appear as part of the grid structure for at least one other user of the plurality of users.

3. The method of claim 1, wherein an orientation of the grid structure in the field of view of the first user initially positions the one or more cells facing the first user, and wherein the method further comprises re-orienting the grid structure in the field of view of the first user so that one or more other cells, of the grid structure, corresponding to another user-specific point of reference for a second user of the plurality of users faces the first user, to thereby replicate for the first user the second user's view to the grid structure.

4. The method of claim 1, further comprising zooming in on the grid structure to enlarge the grid structure in the field of view of the first user.

5. The method of claim 4, wherein a zoom level applied in the zooming is also applied to enlarge the grid structure in the presentation of the grid structure to other users of the plurality of users.

6. The method of claim 1, further comprising overlaying the grid structure over a physical object in the physical environment, the overlaying highlighting for the first user a degree of misalignment between the grid structure and a portion of the physical object.

7. The method of claim 1, further comprising tagging the one or more cells or the digital model elements contributed by the first user with an indication of the first user to identify the first user as having contributed to the one or more cells or the digital model elements.

8. The method of claim 7, further comprising determining an award for the first user based on the tagging.

9. The method of claim 1, wherein the anchor point of reference is a static geolocation.

10. The method of claim 1, wherein the physical environment comprises a physical environment in motion, wherein the plurality of users and the grid structure are moving with the physical environment, wherein the anchor point of reference moves with the physical environment in motion, and wherein the common, static location in the physical environment relative to the plurality of users comprises a changing geolocation that remains static relative to the physical environment in motion and the plurality of users in the environment.

11. The method of claim 1, further comprising providing a live video stream, the live video stream including video of a view of the first user to the physical environment, the video of the view of the first user captured by a camera of the mobile device and the video of the view of the first user being selected based on a desired focus to the physical environment and based further on the view of the first user to the physical environment being superior to views of other users of the plurality of users to the physical environment.

12. A computer program product comprising:
- a computer readable storage medium readable by a processing circuit and storing instructions for execution by the processing circuit for performing a method comprising:
  - identifying an anchor point of reference in a physical environment, the anchor point of reference being a common point in each field of view of a plurality of users co-located in the physical environment;
  - establishing a grid structure in a field of view of a first user, of the plurality of users, using a mobile device of the first user, wherein the grid structure is a three-dimensional augmented reality object virtually positioned based on the anchor point of reference at a common, static location in the physical environment relative to the plurality of users for presentation to the plurality of users;
  - selecting a user-specific point of reference for the first user, the user-specific point of reference for the first user corresponding to one or more cells of the grid structure against which the first user is to work in contributing to a collaborative construction by the plurality of users of a three-dimensional digital model in augmented reality;
  - based on receiving input from the first user, placing augmented reality digital model elements of the three-dimensional digital model into the one or more cells of the grid structure, wherein contribution of the digital model elements by the first user to the three-dimensional digital model are reflected in the grid structure for the plurality of users;
  - ascertaining a volume of cells of the grid structure occupied by digital model elements of the three-dimensional digital model;
  - applying a scaling factor to the ascertained volume, the scaling factor being based on a scale at which the three-dimensional model is being constructed relative to a physical object to be constructed that is being modeled by the three-dimensional digital model, the applying providing an indication of a volume to be occupied by the physical object; and
  - determining an anticipated material cost to build the physical object based on the indicated volume to be occupied by the physical object.

13. The computer program product of claim 12, wherein the grid structure comprises cells of a selected dimension for the plurality of users, and wherein the method further comprises dividing the one or more cells into sub-cells for the first user, wherein the sub-cells are viewable to the first user as part of the grid structure and do not appear as part of the grid structure for at least one other user of the plurality of users.

14. The computer program product of claim 12, wherein an orientation of the grid structure in the field of view of the first user initially positions the one or more cells facing the first user, and wherein the method further comprises re-orienting the grid structure in the field of view of the first user so that one or more other cells, of the grid structure, corresponding to another user-specific point of reference for a second user of the plurality of users faces the first user, to thereby replicate for the first user the second user's view to the grid structure.

15. The computer program product of claim 12, wherein the method further comprises overlaying the grid structure over a physical object in the physical environment, the overlaying highlighting for the first user a degree of misalignment between the grid structure and a portion of the physical object.

16. A computer system comprising:
- a memory; and
- a processor in communication with the memory, wherein the computer system is configured to perform a method comprising:
  - identifying an anchor point of reference in a physical environment, the anchor point of reference being a common point in each field of view of a plurality of users co-located in the physical environment;
  - establishing a grid structure in a field of view of a first user, of the plurality of users, using a mobile device of the first user, wherein the grid structure is a three-dimensional augmented reality object virtually positioned based on the anchor point of reference at a common, static location in the physical environment relative to the plurality of users for presentation to the plurality of users;
  - selecting a user-specific point of reference for the first user, the user-specific point of reference for the first user corresponding to one or more cells of the grid structure against which the first user is to work in contributing to a collaborative construction by the plurality of users of a three-dimensional digital model in augmented reality;
  - based on receiving input from the first user, placing augmented reality digital model elements of the three-dimensional digital model into the one or more cells of the grid structure, wherein contribution of the digital model elements by the first user to the three-dimensional digital model are reflected in the grid structure for the plurality of users;
  - ascertaining a volume of cells of the grid structure occupied by digital model elements of the three-dimensional digital model;
  - applying a scaling factor to the ascertained volume, the scaling factor being based on a scale at which the three-dimensional model is being constructed relative to a physical object to be constructed that is being modeled by the three-dimensional digital model, the applying providing an indication of a volume to be occupied by the physical object; and
  - determining an anticipated material cost to build the physical object based on the indicated volume to be occupied by the physical object.

17. The computer system of claim 16, wherein the grid structure comprises cells of a selected dimension for the plurality of users, and wherein the method further comprises dividing the one or more cells into sub-cells for the first user, wherein the sub-cells are viewable to the first user as part of the grid structure and do not appear as part of the grid structure for at least one other user of the plurality of users.

18. The computer system of claim 16, wherein an orientation of the grid structure in the field of view of the first user initially positions the one or more cells facing the first user, and wherein the method further comprises re-orienting the grid structure in the field of view of the first user so that one or more other cells, of the grid structure, corresponding to another user-specific point of reference for a second user of the plurality of users faces the first user, to thereby replicate for the first user the second user's view to the grid structure.

19. The computer system of claim 16, wherein the method further comprises overlaying the grid structure over a physical object in the physical environment, the overlaying highlighting for the first user a degree of misalignment between the grid structure and a portion of the physical object.

\* \* \* \* \*